(12) United States Patent
Shu et al.

(10) Patent No.: US 10,831,582 B2
(45) Date of Patent: Nov. 10, 2020

(54) SYSTEMS AND METHODS FOR AN ERROR LOGGING MECHANISM AT CONTROLLER AREA NETWORK BUSES

(71) Applicant: Marvell World Trade Ltd., St. Michael (BB)

(72) Inventors: Biing Long Shu, Singapore (SG); Dehuan Meng, Beijing (CN); Hugh Walsh, Los Gatos, CA (US); Fei Wu, Beijing (CN)

(73) Assignee: Marvell Asia Pte, Ltd., Singapore (SG)

( * ) Notice: Subject to any disclaimer, the term of this patent is extended or adjusted under 35 U.S.C. 154(b) by 141 days.

(21) Appl. No.: 15/900,236

(22) Filed: Feb. 20, 2018

(65) Prior Publication Data
US 2018/0239668 A1    Aug. 23, 2018

Related U.S. Application Data

(60) Provisional application No. 62/460,546, filed on Feb. 17, 2017.

(51) Int. Cl.
*G06F 11/07*    (2006.01)
*H04L 12/40*    (2006.01)
(Continued)

(52) U.S. Cl.
CPC ...... *G06F 11/0772* (2013.01); *G06F 11/0706* (2013.01); *G06F 11/0709* (2013.01); *G06F 11/0751* (2013.01); *G06F 11/0778* (2013.01); *G06F 13/24* (2013.01); *G06F 13/4027* (2013.01); *G06F 17/40* (2013.01); *H04L 12/40* (2013.01); *H04L 12/413* (2013.01); *H04L 12/4625* (2013.01); *H04L 12/4633* (2013.01); *H04L 12/4641* (2013.01); *H04L 41/069* (2013.01); *H04L 2012/40215* (2013.01)

(58) Field of Classification Search
CPC combination set(s) only.
See application file for complete search history.

(56) References Cited

U.S. PATENT DOCUMENTS 4,200,912 A * 4/1980 Harrington ............. G06F 13/26
                                                              710/269
5,319,752 A * 6/1994 Petersen ................ G06F 13/128
                                                              709/234
(Continued)

FOREIGN PATENT DOCUMENTS

WO    WO 2006/077900    7/2006

*Primary Examiner* — Amine Riad

(57) ABSTRACT

Embodiments described herein provide a method for an error logging mechanism operated with controller area network (CAN) buses within an Ethernet network. A first interrupt request indicative of a first error condition that occurs at the first CAN bus is received at an Ethernet bridge and from a first CAN controller connected to a first CAN bus. In response to the first interrupt request, the first interrupt request is serviced by retrieving, from a first error register at the first CAN controller, information relating to the first error condition. The information relating to the first error condition is encapsulated in a first frame in compliance with a layer 2 transport protocol for time-sensitive applications. The encapsulated first frame is then sent, via an Ethernet switch, to an error logging device installed at a location remote to the first CAN bus.

20 Claims, 2 Drawing Sheets

(51) Int. Cl.
*H04L 12/46* (2006.01)
*G06F 13/24* (2006.01)
*G06F 13/40* (2006.01)
*G06F 17/40* (2006.01)
*H04L 12/413* (2006.01)
H04L 12/24 (2006.01)

(56) References Cited

U.S. PATENT DOCUMENTS

| | | | | |
|---|---|---|---|---|
| 5,958,029 | A * | 9/1999 | McKinnon | G06F 13/385 |
| | | | | 710/100 |
| 6,115,831 | A * | 9/2000 | Hanf | B60R 16/0315 |
| | | | | 714/43 |
| 7,444,451 | B2 * | 10/2008 | Wang | G06F 13/24 |
| | | | | 710/263 |
| 9,389,940 | B2 * | 7/2016 | Larson | G06F 11/0724 |
| 9,524,258 | B2 * | 12/2016 | Ye | G06F 13/1673 |
| 10,212,081 | B2 * | 2/2019 | Shu | H04L 12/40 |
| 2002/0181405 | A1 | 12/2002 | Ying | |
| 2002/0194466 | A1 * | 12/2002 | Catherwood | G06F 9/30065 |
| | | | | 712/241 |
| 2003/0065855 | A1 * | 4/2003 | Webster | G05B 19/0423 |
| | | | | 710/260 |
| 2004/0044639 | A1 | 3/2004 | Schoenberg et al. | |
| 2012/0105107 | A1 * | 5/2012 | Moon | H03D 13/00 |
| | | | | 327/40 |
| 2013/0196226 | A1 * | 8/2013 | Lee | H01M 4/02 |
| | | | | 429/211 |
| 2015/0003456 | A1 * | 1/2015 | Seo | H04L 12/28 |
| | | | | 370/392 |
| 2016/0171791 | A1 | 6/2016 | Cervantes et al. | |
| 2016/0173330 | A1 * | 6/2016 | Yun | H04B 1/3822 |
| | | | | 370/255 |

* cited by examiner

SYSTEMS AND METHODS FOR AN ERROR LOGGING MECHANISM AT CONTROLLER AREA NETWORK BUSES

CROSS-REFERENCE TO RELATED APPLICATION

This disclosure claims the benefit under 35 U.S.C. § 119(e) of U.S. Provisional Patent Application No. 62/460,546, filed Feb. 17, 2017, which is hereby incorporated by reference herein in its entirety.

FIELD OF USE

This disclosure relates to error handling at a network device, and specifically, to systems and methods for an error logging mechanism for controller area network (CAN) buses.

BACKGROUND OF THE DISCLOSURES

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

CAN is a serial message-based communication protocol that allows microcontrollers and devices to communicate with each other in applications without a host computer. A CAN bus is usually robust physical bus that connects multiple devices in a system, and is configured to transmit messages between the multiple devices under the message-based protocol without any central arbitration. Within a CAN bus, messages are broadcasted to all nodes on the bus. For example, CAN buses may be used in an automotive system to connect various electronic control units (ECUs), devices or other components within or between subsystems.

CAN buses are usually provided with a built-in error processing mechanism, such that errors detected in messages transmitted across the CAN bus can be monitored and acted upon. Conventionally, a diagnostic or error logging device monitoring the CAN bus for errors is physically connected to the CAN bus. However, when the CAN bus is configured to transmit messages through an Ethernet network, the diagnostic device or data logger may be connected to another part of the network in order to detect errors in the transmitted messages and may not be physically attached to the CAN bus. Moreover, when each CAN bus requires to be connected with a diagnostic or error logging device, the number of error logging devices needed in a complex system with a large number of CAN buses can be significant, which largely increases the cost to build the circuit.

SUMMARY

Embodiments described herein provide a method for an error logging mechanism operated with controller area network (CAN) buses within an Ethernet network. A first interrupt request indicative of a first error condition that occurs at the first CAN bus is received at an Ethernet bridge and from a first CAN controller connected to a first CAN bus. In response to the first interrupt request, the first interrupt request is serviced by retrieving, from a first error register at the first CAN controller, information relating to the first error condition. The information relating to the first error condition is encapsulated in a first frame in compliance with a layer 2 transport protocol for time-sensitive applications. The encapsulated first frame is then sent, via an Ethernet switch, to an error logging device installed at a location remote to the first CAN bus.

In some implementations, the information relating to the first error condition includes any of an error type, a time when the first error condition occurs, and a source identifier identifying a first device where the first error condition occurs.

In some implementations, an error type is written at a time when the first error condition occurs, and a source identifier identifying a first device where the first error condition occurs into corresponding data fields of the first frame in a format defined by the IEEE 1722a protocol.

In some implementations, a timestamp parameter is captured under a generalized Precision Time Protocol (gPTP) under IEEE 802.1AS. The timestamp parameter is indicative of the time when the interrupt request is serviced. The timestamp parameter is written into the first frame.

In some implementations, a source address identifying the error logging device is encapsulated into the first frame.

In some implementations, the encapsulated frame is to be received and parsed by the error logging device to extract information including any of an error type, a time when the first error condition occurs, and a source identifier identifying a first device where the first error condition occurs.

In some implementations, the error logging device is configured to generate an error log file storing the extracted information from the encapsulated first frame.

In some implementations, a second interrupt request indicative of a second error condition that occurs at the second CAN bus is received, at the same Ethernet bridge and from the first CAN controller connected to a second CAN bus. In response to the second interrupt request, the second interrupt request is serviced, by the same Ethernet bridge, by retrieving, from a second error register at the first CAN controller, information relating to the second error condition. The information relating to the second error condition is encapsulated in a second frame in compliance with a layer 2 transport protocol for time-sensitive applications. The encapsulated second frame is then sent, via the Ethernet switch, to the error logging device installed at a location remote to the first CAN bus. The error logging device is configured to create an error log file to store the information relating to the second error condition.

In some implementations, a second interrupt request indicative of a second error condition that occurs at the second CAN bus is received, at the same Ethernet bridge and from a second CAN controller connected to a second CAN bus. The second interrupt request is serviced to send error information relating to the second interrupt request to the same error logging device.

In some implementations, the first interrupt request and the second interrupt request are simultaneously serviced at the same Ethernet bridge when the first interrupt request and the second interrupt request are received at the same Ethernet bridge at the same time.

Embodiments described herein provide a system for an error logging mechanism operated with CAN buses within an Ethernet network. The system includes an Ethernet bridge. The Ethernet bridge is configured to receive, from a first CAN controller connected to a first CAN bus, a first interrupt request indicative of a first error condition that occurs at the first CAN bus. The Ethernet bridge is further configured to in response to the first interrupt request, service the first interrupt request by retrieving, from a first error register at the first CAN controller, information relating to the first error condition. The Ethernet Bridge is further configured to encapsulate the information relating to the first error condition in a first frame in compliance with a layer 2 transport protocol for time-sensitive applications. The Ethernet bridge is further configured to send, via an Ethernet switch, the encapsulated first frame to an error logging device installed at a location remote to the first CAN bus.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for an error logging mechanism for controller area network (CAN) buses. Specifically, instead of using an error logging device directly attached to each CAN bus, an error logging device is remotely installed, which can be configured to log error conditions from multiple CAN buses. For example, the error logging device may be installed at a location on an Ethernet network but remote to the location of a CAN bus. To have the remotely installed error logging device receive and log error conditions from a CAN bus that is remote to the error logging device, an intermediate bridge is used to collect error information from the CAN bus, and then to encapsulate the error information into an IEEE 1722a frame for sending over an Ethernet connection to the error logging device. The remotely installed error logging device may be configured to receive the IEEE 1722a frame as part of the Ethernet communication and parse error information from the received frame. In this way, the remotely installed error logging device is able to receive and log error information from more than one CAN bus.

Figure 1:
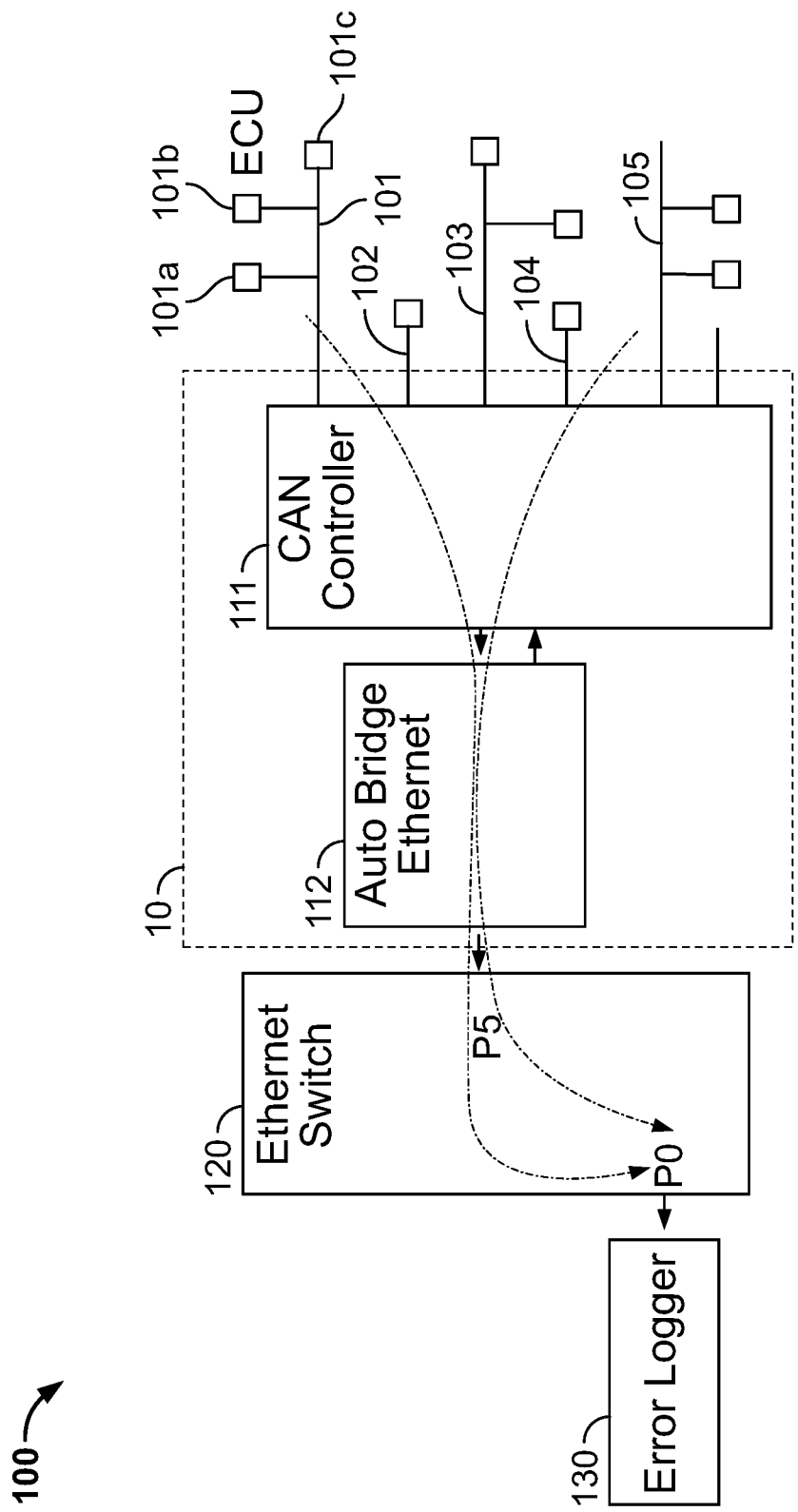
FIG. 1 is an example block diagram illustrating a network device including an auto-bridge Ethernet (ABE) module configured to implement an error logging mechanism with an error logging device installed at a location remote to a CAN bus, according to an embodiment described herein.

FIG. 1 is an example block diagram 100 illustrating a network device including an auto-bridge Ethernet (ABE) module configured to implement an error logging mechanism with an error logging device installed at a location remote to a CAN bus, according to an embodiment described herein. Diagram 100 illustrates a network device 110, one side of which is connected to a plurality of CAN buses 101-105, and the other side of which is connected to an Ethernet network via an Ethernet switch 120. Specifically, the network device 100 includes a CAN controller 111, which is connected to the plurality of CAN buses 101-105. Each of the CAN buses 101-105 may be connected to a plurality of devices to facilitate direct communication between these devices via the respective CAN bus. For example, devices 101a-c, which may be ECUs or other devices, may be connected to the CAN bus 101 and exchange messages between each other via the CAN bus 101.

In some embodiments, the CAN controller 111 is configured to monitor an operational status of each of the connected CAN buses 101-105. For example, when an error condition occurs on the CAN bus 101, the CAN bus controller 111 is configured to detect that an error condition has occurred and then to react per the CAN protocol. In response to the detected error condition on the CAN bus 101, the CAN bus controller 111 is configured to update an error register within the CAN controller 111 to reflect the error condition relating to the CAN bus 101.

The network device 10 may further include an ABE module 112, which is configured to read the error register from the CAN controller 111 and react to the error condition stored in the error register. For example, the ABE module 112 is configured to interpret the error condition as an interrupt request from the CAN controller 111 whenever an error condition is detected and registered with the CAN controller 111. The ABE module 112 may then service the interrupt request, e.g., by reading the error register from the CAN bus controller 111 for information including a source device (e.g., one or more of 101a-c) where the error has occurred, a type of the error, and/or the like. The ABE module 112 may also capture a timestamp parameter under the generalized Precision Time Protocol (gPTP) under IEEE 802.1AS indicative of the time when the interrupt request is serviced. The ABE module 112 may then encapsulate the timestamp parameter and error information into a frame in compliance of a layer 2 transport protocol for time-sensitive applications, e.g., IEEE 1722a. And then the ABE module 112 may send the 1722a frame out through the Ethernet network, e.g., to the Ethernet switch 120. Specifically, the ABE module 112 may program data fields of the 1722a frame, e.g., the virtual local area network (VLAN) field, destination address, source address, stream identifier, and/or other data fields in the overhead of the 1722a frame to point to a diagnostic or error logging device 130 attached remotely to the network. In this way, the 1722a frame can be routed to the error logging device 130 via the Ethernet switch 120.

The diagnostic or error logging device 130 is installed remotely from the CAN buses 101-105, as opposed to a conventional scheme where the error logging device is usually physically attached to each CAN bus 101-105 such that the error logging device can receive error information directly via the respective bus whenever an error condition arises at the respective CAN bus. For example, as shown in FIG. 1, the error logging device 130 may be installed at a location remote to the CAN buses 101-105 and the CAN controller 111, which can only be accessed by the CAN controller 111 via an Ethernet connection. The error logging device 130 is configured to receive the 1722a frame forwarded by the Ethernet switch 120, e.g., based on the destination address in the header of the 1722a frame. Thus, the error logging device 130 is configured to parse error information from the 1722a frame, such as but not limited to the error type, the time that the error occurred, an identifier of the device where the error occurred, an identifier of the CAN bus where the error was sent through, and/or the like. The error logging device 130 may then generate a log file to record the error information received from the 1722a frame. In this way, even if the error logging device 130 is remotely located from the CAN buses 101-105, the error information can be observed and logged directly to the CAN bus itself.

When the error logging device 130 is remotely located from the CAN bus, a single error logging device 130 can be used to receive and log error information from different CAN buses. For example, when an error condition occurs on any of the CAN buses 102-105, the CAN controller 111 may detect and register the error information in the error register such that the error information can be read and encapsulated by the ABE module 112 in a similar manner described above. Therefore, when the error logging device 130 is remotely located from the CAN buses 101-105, the network architecture including the ABE module 112 allows a single error logging device 130 to log error information from multiple CAN buses 101-105, as opposed to the conventional mechanism where each CAN bus has a locally attached error logging device.

In some implementations, when the CAN controller 111 detects error conditions that originate from different CAN buses 101-105 at the same time, the ABE module 112 may be configured to process and encapsulate the error information into separate 1722a frames and send to the Ethernet switch 120 in parallel. In this way, when a network system includes a large number of CAN buses, the number of error logging devices that are required to record error information for the CAN buses can be reduced by placing the error logging devices at a remote location from the CAN buses, which reduces the manufacturing and/or configuration cost of the system.

Figure 2:
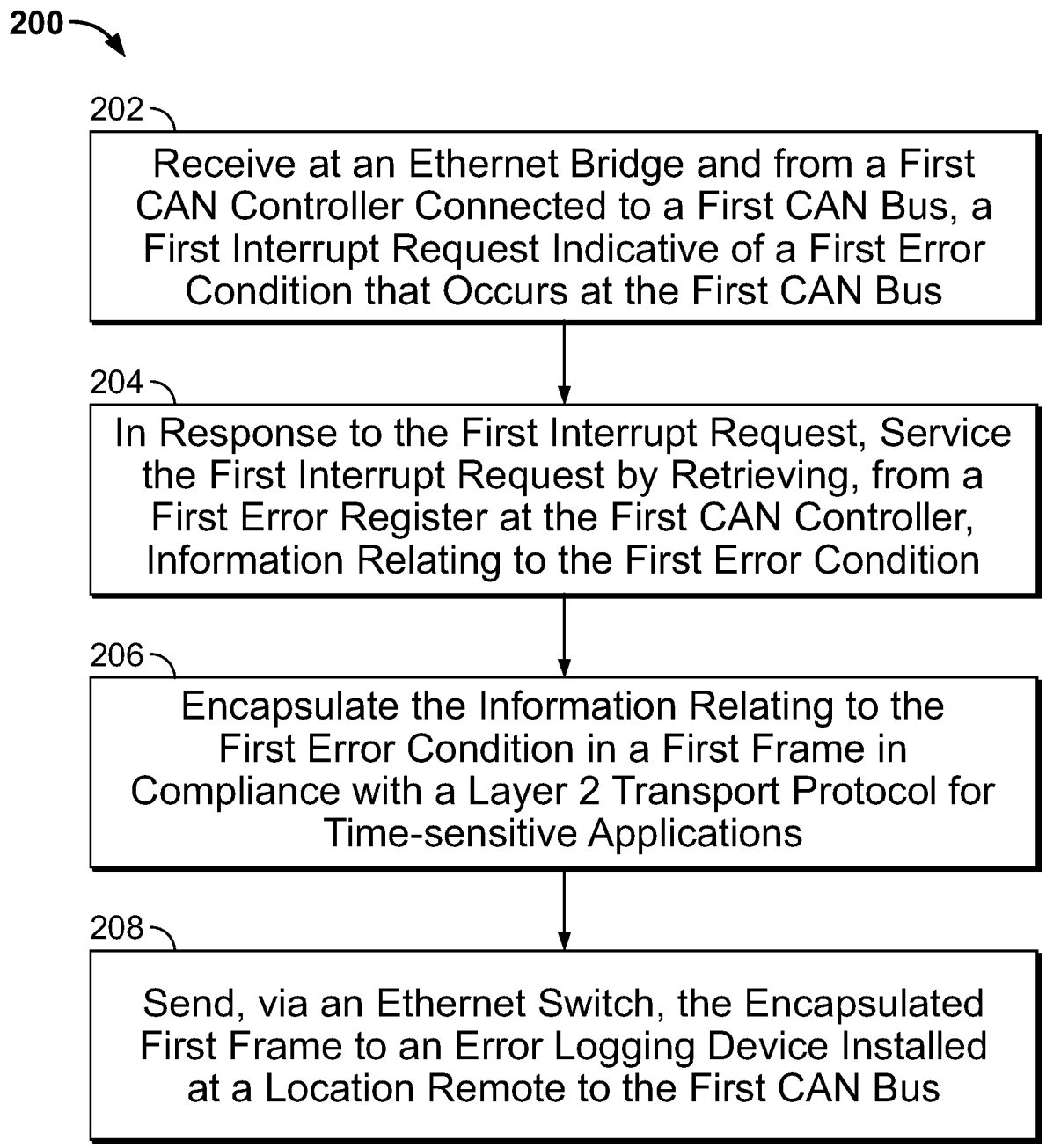
FIG. 2 is an example logic flow diagram illustrating remotely logging an error condition that occurred on a CAN bus at an error logging device installed at a location remote to the CAN bus, according to an embodiment described herein.

FIG. 2 is an example logic flow diagram 200 illustrating remotely logging an error condition that occurred on a CAN bus at an error logging device installed at a location remote to the CAN bus, according to an embodiment described herein. At 202, an interrupt request is received, at an Ethernet bridge (e.g., see ABE module 112 in FIG. 1) and from a CAN controller (e.g., 111 in FIG. 1) connected to a first CAN bus (e.g., see CAN bus 101 in FIG. 1). The interrupt request is indicative of a first error condition that occurred at the first CAN bus. At 204, in response to the interrupt request, the interrupt request is serviced by retrieving, from an error register at the CAN controller (e.g., see 111 in FIG. 1), information relating to the first error condition. For example, the information relating to the first error condition may include but not limited to the error type, the time of the error condition, a source address of the error condition, and/or the like. At 206, the information relating to the first error condition is encapsulated, e.g., by the ABE module 112 in FIG. 1, into a frame in compliance with a layer 2 transport protocol for time-sensitive applications, e.g., IEEE 1722a. For example, the encapsulated frame includes a destination address relating to a remote error logging device (e.g., 130 in FIG. 1) that the frame is intended for. At 208, the encapsulated frame is sent, via an Ethernet switch (e.g., see 120 in FIG. 1), to an error logging device (e.g., see 130 in FIG. 1) installed at a location remote to the first CAN bus. The error logging device in turn parses the frame to extract error information such as the error type, the time of the error condition, a source address of the error condition, and/or the like to create a log file storing the error condition that occurred at the first CAN bus.

Various embodiments discussed in conjunction with FIGS. 1-2 are performed by various electronic components of one or more electronic circuits, such as but not limited to an integrated circuit, application-specific integrated circuit (ASIC), DSP, and/or the like. Various components discussed throughout this disclosure such as, but not limited to CAN buses (e.g., 101-105 in FIG. 1), a CAN controller (e.g., 111 in FIG. 1), an ABE module (e.g., 112 in FIG. 1), and/or the like, are configured to include a set of electronic circuit components and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for an error logging mechanism operated with controller area network (CAN) buses within an Ethernet network, the method comprising:
   receiving, at an Ethernet bridge and from a first CAN controller connected to a first CAN bus, a first interrupt request indicative of a first error condition that occurs at the first CAN bus;
   in response to the first interrupt request, servicing, by an Ethernet bridge coupled to the first CAN controller, the first interrupt request by retrieving, from a first error register at the first CAN controller, information relating to the first error condition;
   encapsulating at the Ethernet bridge the information relating to the first error condition in a first frame in compliance with a layer 2 transport protocol for time-sensitive applications; and
   sending, via an Ethernet switch, the encapsulated first frame to an error logging device installed at a location remote to the first CAN bus.

2. The method of claim 1, wherein the information relating to the first error condition includes any of an error type, a time when the first error condition occurs, and a source identifier identifying a first device where the first error condition occurs.

3. The method of claim 1, wherein the encapsulating the information relating to the first error condition in a first frame in compliance with a layer 2 transport protocol for time-sensitive applications comprises:
   writing an error type, a time when the first error condition occurs, and a source identifier identifying a first device where the first error condition occurs into corresponding data fields of the first frame in a format defined by the IEEE 1722a protocol.

4. The method of claim 3, wherein the encapsulating the information relating to the first error condition in a first frame in compliance with a layer 2 transport protocol for time-sensitive applications further comprises:
capturing a timestamp parameter under a generalized Precision Time Protocol (gPTP) under IEEE 802.1AS, wherein the timestamp parameter is indicative of the time when the interrupt request is serviced; and
writing the timestamp parameter into the first frame.

5. The method of claim 3, wherein the encapsulating the information relating to the first error condition in a first frame in compliance with a layer 2 transport protocol for time-sensitive applications further comprises:
encapsulating a source address identifying the error logging device into the first frame.

6. The method of claim 5, wherein the encapsulated frame is to be received and parsed by the error logging device to extract information including any of an error type, a time when the first error condition occurs, and a source identifier identifying a first device where the first error condition occurs.

7. The method of claim 6, wherein the error logging device is configured to generate an error log file storing the extracted information from the encapsulated first frame.

8. The method of claim 1, further comprising:
receiving, at the same Ethernet bridge and from the first CAN controller connected to a second CAN bus, a second interrupt request indicative of a second error condition that occurs at the second CAN bus;
in response to the second interrupt request, servicing, by the same Ethernet bridge, the second interrupt request by retrieving, from a second error register at the first CAN controller, information relating to the second error condition;
encapsulating at the Ethernet bridge the information relating to the second error condition in a second frame in compliance with a layer 2 transport protocol for time-sensitive applications; and
sending, via the Ethernet switch, the encapsulated second frame to the error logging device installed at a location remote to the first CAN bus,
wherein the error logging device is configured to create an error log file to store the information relating to the second error condition.

9. The method of claim 1, further comprising:
receiving, at the same Ethernet bridge and from a second CAN controller connected to a second CAN bus, a second interrupt request indicative of a second error condition that occurs at the second CAN bus; and
servicing at the Ethernet bridge the second interrupt request to send error information relating to the second interrupt request to the same error logging device.

10. The method of claim 9, further comprising:
simultaneously servicing the first interrupt request and the second interrupt request at the same Ethernet bridge when the first interrupt request and the second interrupt request are received at the same Ethernet bridge at the same time.

11. A system for an error logging mechanism operated with controller area network (CAN) buses within an Ethernet network, the system comprising:
an Ethernet bridge configured to:
receive, from a first CAN controller connected to a first CAN bus, a first interrupt request indicative of a first error condition that occurs at the first CAN bus,
in response to the first interrupt request, service the first interrupt request by retrieving, from a first error register at the first CAN controller coupled to the Ethernet bridge, information relating to the first error condition,
encapsulate the information relating to the first error condition in a first frame in compliance with a layer 2 transport protocol for time-sensitive applications, and
send, via an Ethernet switch, the encapsulated first frame to an error logging device installed at a location remote to the first CAN bus.

12. The system of claim 11, wherein the information relating to the first error condition includes any of an error type, a time when the first error condition occurs, and a source identifier identifying a first device where the first error condition occurs.

13. The system of claim 11, wherein the Ethernet bridge, when encapsulating the information relating to the first error condition in a first frame in compliance with a layer 2 transport protocol for time-sensitive applications, is further configured to:
write an error type, a time when the first error condition occurs, and a source identifier identifying a first device where the first error condition occurs into corresponding data fields of the first frame in a format defined by the IEEE 1722a protocol.

14. The system of claim 13, wherein the Ethernet bridge, when encapsulating the information relating to the first error condition in a first frame in compliance with a layer 2 transport protocol for time-sensitive applications, is further configured to:
capture a timestamp parameter under a generalized Precision Time Protocol (gPTP) under IEEE 802.1AS, wherein the timestamp parameter is indicative of the time when the interrupt request is serviced; and
write the timestamp parameter into the first frame.

15. The system of claim 13, wherein the Ethernet bridge, when encapsulating the information relating to the first error condition in a first frame in compliance with a layer 2 transport protocol for time-sensitive applications, is further configured to:
encapsulate a source address identifying the error logging device into the first frame.

16. The system of claim 15, wherein the encapsulated frame is to be received and parsed by the error logging device to extract information including any of an error type, a time when the first error condition occurs, and a source identifier identifying a first device where the first error condition occurs.

17. The system of claim 16, wherein the error logging device is configured to generate an error log file storing the extracted information from the encapsulated first frame.

18. The system of claim 11, wherein the Ethernet bridge is further configured to:
receive, at the same Ethernet bridge and from the first CAN controller connected to a second CAN bus, a second interrupt request indicative of a second error condition that occurs at the second CAN bus;
in response to the second interrupt request, service, by the same Ethernet bridge, the second interrupt request by retrieving, from a second error register at the first CAN controller, information relating to the second error condition;
encapsulate at the Ethernet bridge the information relating to the second error condition in a second frame in compliance with a layer 2 transport protocol for time-sensitive applications; and send, via the Ethernet switch, the encapsulated second frame to the error logging device installed at a location remote to the first CAN bus,
wherein the error logging device is configured to create an error log file to store the information relating to the second error condition.

19. The system of claim 11, wherein the Ethernet bridge is further configured to:
receive, at the same Ethernet bridge and from a second CAN controller connected to a second CAN bus, a second interrupt request indicative of a second error condition that occurs at the second CAN bus; and
service at the Ethernet bridge the second interrupt request to send error information relating to the second interrupt request to the same error logging device.

20. The system of claim 19, wherein the Ethernet bridge is further configured to:
simultaneously service the first interrupt request and the second interrupt request at the same Ethernet bridge when the first interrupt request and the second interrupt request are received at the same Ethernet bridge at the same time.

* * * * *